United States Patent [19]

Pesce

[11] Patent Number: 5,070,248

[45] Date of Patent: Dec. 3, 1991

[54] CASSETTE WITH INTENSIFYING SCREENS TO BE USED WITH AN X-RAY FILM

[75] Inventor: Sergio Pesce, Savona, Italy

[73] Assignee: Minnesota Mining and Manufacturing Company, St. Paul, Minn.

[21] Appl. No.: 550,677

[22] Filed: Jul. 10, 1990

[30] Foreign Application Priority Data

Jul. 12, 1989 [IT] Italy .............................. 21165 A/89

[51] Int. Cl.$^5$ .............................................. G03C 1/46
[52] U.S. Cl. .............................. 250/483.1; 250/486.1; 378/182
[58] Field of Search ............... 378/169, 185, 182, 187, 378/188; 250/483.1, 486.1, 487.1, 475.2; 430/496

[56] References Cited

U.S. PATENT DOCUMENTS

| 4,513,078 | 4/1985 | Sandrik et al. | 250/475.2 |
| 4,529,647 | 7/1985 | Maeoka et al. | 250/486.1 |
| 4,630,297 | 12/1986 | Lerma | 378/185 |
| 4,839,243 | 1/1989 | Shimizu et al. | 250/486.1 |
| 4,893,021 | 1/1990 | Bollen et al. | 250/487.1 |
| 4,997,750 | 3/1991 | Dickerson et al. | 430/496 X |
| 5,021,327 | 6/1991 | Bunch et al. | 430/496 |

FOREIGN PATENT DOCUMENTS

| 0787017 | 9/1935 | France | 378/185 |
| 60-175000 | 9/1985 | Japan | 250/486.1 |

OTHER PUBLICATIONS

Research Disclosure 19931, Nov. 1980.

Primary Examiner—Constantine Hannaher
Assistant Examiner—Edward J. Glick
Attorney, Agent, or Firm—Gary L. Griswold; Walter N. Kirn; Mark A. Litman

[57] ABSTRACT

The present invention refers to a cassette comprising a front element hinged on the rear edge thereof to a back element of the cassette and a first fluorescent intensifying screen fixed, in the interior of said cassette, to said front element and a second fluorescent intensifying screen fixed, in the interior of said cassette, to said back element of the cassette, to be used with a radiographic film situated between and in close contact with said screens.

The cassette is characterized by the fact that the first intensifying screen comprises a first radiation emitting phosphor and the second intensifying screen comprises a second radiation emitting phosphor, and in that said first radiation emitted by said first intensifying screen are in a first wavelength region of the electromagnetic spectrum and said second radiation emitted by said second intensifying screen are in a second region of the electromagnetic spectrum.

The cassette is for use with a combination of photosensitive elements for radiography formed by the pair of radiographic fluorescent screens and a double-side coated silver halide radiographic element. Each screen is arranged adjacent to each silver halide layer, each screen is capable of imagewise emitting radiation to which the adjacent silver halide layer is sensitive when imagewise exposed to X radiation and each silver halide emulsion layer is substantially insensitive to the radiation emitted by the opposite screen.

9 Claims, 5 Drawing Sheets

CASSETTE WITH INTENSIFYING SCREENS TO BE USED WITH AN X-RAY FILM

FIELD OF THE INVENTION

The present invention refers to a radiographic cassette provided with intensifying screens fixed, in the interior of said cassette, to a front element and to a back element of the cassette, to be used in industrial or medical radiography in combination with a double-side coated silver halide radiographic element.

BACKGROUND OF THE INVENTION

In radiography, and particularly in medical radiography, light-sensitive elements having silver halide emulsion layers coated on both faces of a transparent support (called double-side coated silver halide elements) are used. Said double coated silver halide elements are generally used in combination with fluorescent phosphor screens in order to reduce the X radiation exposure necessary to obtain the required image. Generally, one fluorescent phosphor screen is used in association with each silver halide emulsion layer of the double coated element. The silver halide emulsions used in the double coated element are sensitized to a region of the electromagnetic spectrum corresponding to the wave length of the light emitted by the phosphor materials used in the fluorescent phosphor screens, thus obtaining a significant amplification factor.

It is known that in radiography the silver halide radiographic elements are exposed in radiographic cassettes consisting substantially of a base element, generally permeable to X-rays, and an upper element, generally permeable to X-rays, which are joined together by a vertical perimetral element so as to form a container having an essentially flat parallelepiped shape. Said flat horizontal upper and base elements and said vertical element have the minimum dimensions necessary for containing a radiographic film of a certain format disposed between intensifying screens fixed to said upper and base elements. Said screens are uniformly pressed against the film so as to ensure good uniform contact with the film, as known in the art. Said base element is generally constructed in the form of a lid hinged along the rear edge of the cassette. Radiographic cassettes are described, for example, in U.S. Pat. Nos. 3,323,676, 3,504,180, 4,264,821, 4,352,198, 4,630,297, and the European patent applications Nos. 18,564 and 26,358.

The quality of the image obtained upon X radiation exposure of said screen pair and double coated silver halide element combination and development of said double coated silver halide element is negatively affected by crossover exposure. Crossover exposure, which causes a reduction in image sharpness, occurs in double coated silver halide elements when light emitted by one fluorescent phosphor screen passes through the adjacent silver halide emulsion layer and, the light having been spread by the support, imagewise exposes the silver halide emulsion layer on the opposite face of the support.

The crossover exposure causes poor definition even if light-sensitive elements are used which employ reduced silver halide coverages to lower the costs or increase the processing speed of the element. In fact, the decrease of the emulsion turbidity increases the amount of light available for crossover and therefore worsens the image.

To reduce the crossover exposure, dyes or pigments can be used within the radiographic element. The absorption of said dyes or pigments is in a region of the electromagnetic spectrum corresponding to the wavelength of the light emitted by the fluorescent phosphor screens. The dyes or pigments absorb some of the light emitted by the fluorescent phosphor screen so that imaging of a silver halide emulsion layer by the opposite screen is reduced by absorbance of the light from the opposite screen by the anticrossover dyes or pigments. These dyes or pigments are eliminated during the photographic developing, fixing and washing process of the exposed material; they can be for instance washed away or, more preferably, bleached while processing the radiographic element.

The dyes can be incorporated in any layer of the light-sensitive element: in the emulsion layer, in an intermediate layer between the emulsion and the base, or in the subbing layer of the support base. It is preferred to incorporate the dyes in a layer different from that containing the emulsion to avoid possible desensitization phenomena. Since 1978, Minnesota Mining and Manufacturing Company has sold a radiographic element under the name of 3M Trimax TM Type XUD X-Ray Film to be used in combination with 3M Trimax TM Intensifying Screens. Such radiographic element comprises a transparent polyester base, each surface of which has a silver halide emulsion layer sensitized to the light emitted by the screens. Between the emulsion and the base is a gelatin layer containing water-soluble acid dyes, which dyes can be decolorized during processing and have an absorption in a region of the electromagnetic spectrum corresponding to the wavelength of the light emitted by the screens and of the spectral sensitivity of the emulsion. The dyes are anchored in the layer by means of a basic mordant consisting of polyvinylpyridine.

In the practical solution of reducing the crossover exposure by using a mordanted dye layer (as described for instance in the European Patent Application 101,295), some problems are created which up to now have not yet been solved properly. In fact, the improvement of image definition involves not only a natural decrease of the light-sensitive element sensitivity caused by the absorption of the transmitted light which otherwise would take part in the formation of a part of the image, but also the possibility of desensitization phenomena due to the migration of dye not firmly mordanted in the silver halide emulsion layer. There is also a problem with residual stain even after processing, the retention of significant quantities of thiosulfate from the fixing bath which causes image Yellowing upon long-time storage on shelf, and lengthening of the drying times after processing because of element thickening.

Other approaches have been suggested to reduce crossover, as reported hereinafter.

U.S. Pat. No. 3,923,515 discloses a relatively lower speed silver halide emulsion between the support and a higher speed silver halide emulsion layer to reduce crossover.

U.S. Pat. No. 4,639,411 discloses a photographic element, to be used with blue emitting intensifying screens, having reduced crossover, said element comprising coated on both sides or a transparent support a blue sensitive silver halide emulsion layer and, interposed between the support and the emulsion layer, a blue absorbing layer comprising bright yellow silver iodide grains of a specific crystal structure.

Japanese Patent Application 62-52546 discloses a radiographic element of improved image quality comprising coated on both sides of a transparent support a light sensitive silver halide emulsion layer and, interposed between the support and the emulsion layer, a layer containing water insoluble metal salt particles having adsorbed on their surface a dye. Said dye has a maximum absorption within the range of ±20 nm of the maximum absorption of said silver halide and corresponds to the light emitted by intensifying screens. Silver halides are disclosed as preferred metal salt particles.

Japanese Patent Application 62-99748 discloses a radiographic element of improved image quality comprising coated on both sides of a transparent support a light-sensitive silver halide emulsion layer and, interposed between the support and the emulsion layer, a silver halide emulsion layer having substantially no light-sensitivity.

The approaches of using light-insensitive silver halide layers as anticrossover layers interposed between the support and the light-sensitive silver halide emulsion layers, although preferred to using dyes or pigments, encounter some problems such as the increase of silver coverage and bad bleaching characteristics in photographic processing (residual stain).

The following are additional documents illustrating the state of the art.

BE 757,815 discloses a combination of a silver halide element and an intensifying screen comprising a fluorescent compound emitting light of wavelength less than 410 nm.

U.S. Pat. No. 4,130,428 discloses a combination of two fluorescent screens and a double coated silver halide element wherein the maximum emission of the screens is in the wavelength range of 450-570 nm and silver halide layers are sensitive to light in the same wavelength range.

U.S. Pat. No. 3,795,814, 4,070,583 and GB 2,119,396 disclose rare earth oxyhalide phosphors activated with terbium and/or thulium employed in fluorescent screens having UV emission.

FR 2,264,306 discloses a combination of a silver halide element and fluorescent screen comprising a rare earth activated rare earth oxyhalide phosphor having it maximum emission in the wavelength range of 400-500 nm.

EP 88,820 discloses a radiographic fluorescent screen comprising a first blue emitting phosphor layer and a second green emitting phosphor layer to be combined with a silver halide element having spectral sensitivity in the blue-green region ("ortho-type" elements).

JP 60175-000 discloses a combination of a double coated silver halide element and a screen pair wherein the fluorescent layers of the two screens have different wavelength region emissions and each screen comprises an organic dye to absorb the light emitted by the opposite screen.

EP 232,888 discloses a combination of a double coated silver halide element and a pair of front and back intensifying screens wherein said front and back screens, emitting light in the same wavelength region, have different modulation transfer factors to be used in low energy radiography.

U.S. Pat. No. 4,480,024 discloses the combination of a silver halide photothermographic element and a rare-earth intensifying screen which are uniquely adapted to one another for the purpose of industrial radiographic imaging. The photothermographic element is dye-sensitized to the spectral emission of the screen and the combination of screen and element has an amplification factor greater or equal to at least 50. According to this invention preferably a single screen is used in combination with a single-side coated photothermographic element, or double screens with either single-side or a double-side coated photothermographic elements, the latter without any significant benefit and at increased cost of film.

SUMMARY OF THE INVENTION

The present invention describes a cassette comprising a front element hinged on its rear edge to a back element of the cassette and a first intensifying fluorescent screen fixed, in the interior of said cassette, to said front element and a second intensifying fluorescent screen fixed, in the interior of said cassette, to said back element of the cassette, to be used with a radiographic film situated between and in close contact with said screens. The cassette is characterized by the fact that the first intensifying screen comprises a first radiation emitting phosphor and the second intensifying screen comprises a second radiation emitting phosphor, and in that said first radiation emitted by said first intensifying screen are in a first region of the electromagnetic spectrum and said second radiation emitted by said second intensifying screen are in a second region of the electromagnetic spectrum.

In particular, the present invention refers to a cassette as described above wherein said first radiation emitted by said first intensifying screen differ from said second radiation emitted by said second intensifying screen of at least 50 nm.

More in particular, the present invention refers to a cassette as described above wherein said first intensifying screen comprises a phosphor which emits non-actinic radiation, preferably green radiation, and said second intensifying screen comprises a phosphor which emits actinic radiation, preferably UV radiation.

The cassette is to be used with a combination of photosensitive elements for radiography comprising a pair of fluorescent radiographic screens and a double-side coated silver halide radiographic element. Each screen is placed adjacent to each silver halide layer, each screen is capable of imagewise emitting radiation to which the adjacent silver halide layer is sensitive when imagewise exposed to X radiation, and each silver halide emulsion layer is substantially insensitive to the radiation emitted by the opposite screen.

DETAILED DESCRIPTION OF THE INVENTION

The present invention will be now described in detail.

Figure 1:
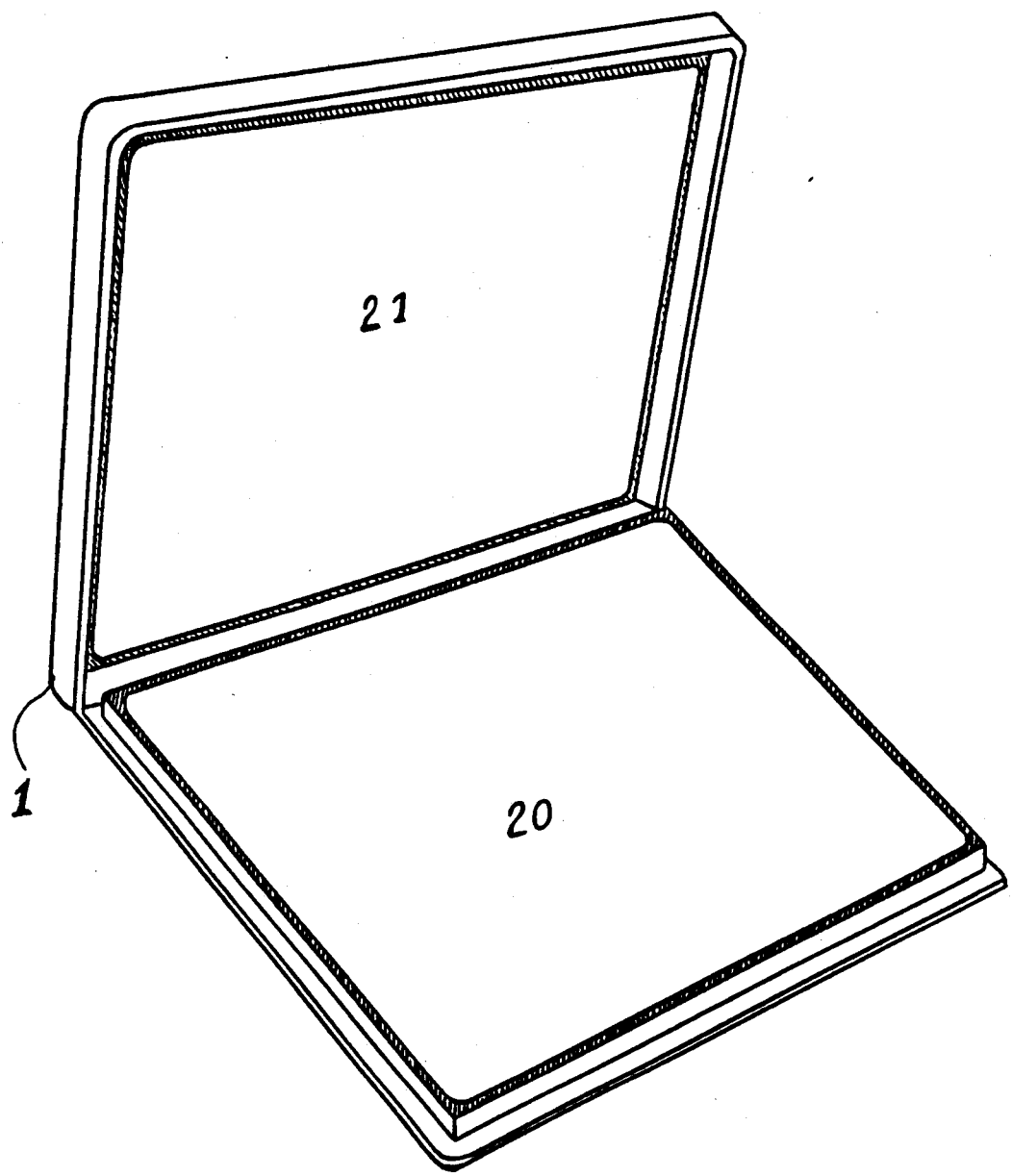
FIG. 1 shows an opened cassette with intensifying screens fixed to the front and back elements of the cassette.

FIG. 1 represents an opened cassette 1 with a front intensifying screen 21 fixed, in the interior of said cassette, to the front element of the cassette and a back intensifying screen 20 fixed, in the interior of said cassette, to the back element of the cassette.

Figure 2:
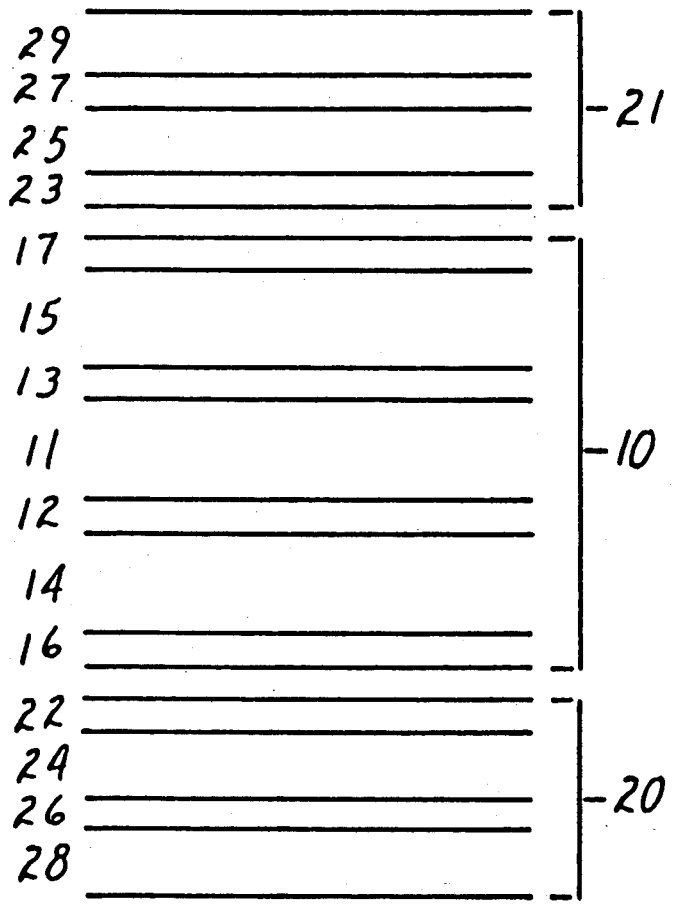
FIG. 2 is a scheme of a combination consisting of a radiographic element and a pair of screens to be used in the present invention.

FIG. 2 represents in details a combination formed by a pair of screens and a double-side coated silver halide element to be used in the present invention. The combination comprises three distinct photosensitive elements: a double-side coated silver halide radiographic element 10, front screen 21 and back screen 20.

As shown, the double-side coated silver halide radiographic element 10 comprises a support base 11 and, coated on the opposite faces thereof, sublayers 12 and 13. Sublayer 13 is coated with a front silver halide emulsion layer 15 and sublayer 12, on the opposite face of the support base, is coated with a back silver halide emulsion layer 14. Protective layers 16 and 17 are coated on emulsion layers 14 and 15, respectively.

As shown, the radiographic fluorescent front screen 21 comprises a support 29-, a reflecting layer 27, a fluorescent phosphor containing layer 25 and a protective layer 23. Similarly, the radiographic fluorescent back screen 20 comprises a support 28, a reflecting layer 26, a fluorescent phosphor containing layer 24 and a protective layer 22.

In practical use, the screen pair and the silver halide element are compressed in the radiographic cassette of the present invention with the front screen arranged adjacent and in close contact with the front silver halide emulsion layer and the back screen arranged adjacent and in close contact with the back silver emulsion halide layer. Imagewise X radiation enters the screen pair and silver halide element combination through the front screen support 29 and reflective layer 27 and passes the front screen fluorescent phosphor layer 25. A portion of the X radiation is absorbed in the phosphor layer 25. The remaining X radiation passes through the protective layers 23 and 17. A small portion of the X radiation is absorbed in the front silver halide emulsion layer 15, thereby contributing directly to the formation of a latent image in said front silver halide emulsion layer 15. The major portion of the X radiation passes through the subbing layer 13, the support 11 and the subbing layer 12. Again, a small portion of the X radiation is absorbed in the back silver halide emulsion layer 14, thereby contributing directly to the formation of a latent image in said back silver halide emulsion layer 14. Again, the major portion of the X radiation passes through the protective layers 16 and 22 and is absorbed in the back fluorescent phosphor layer 24. The imagewise X radiation is principally absorbed in the fluorescent phosphor layers 24 and 25, thereby producing the emission of longer wavelength radiation. According to the present invention, the first radiation emitted by the front fluorescent phosphor layer 25 exposes the adjacent front silver halide emulsion layer 15, and the second radiation emitted by the back fluorescent phosphor layer 24 exposes the adjacent back silver halide emulsion layer 14. The silver halide emulsions are substantially insensitive to the radiation emitted by the opposite fluorescent phosphor layer. Said radiation emitted by a fluorescent phosphor layer passing to at least some extent beyond the adjacent silver halide emulsion layer penetrates the subbing layers and the support to expose the opposite silver halide emulsion layer. This fact, while increasing to some extent the speed of the screen pair and silver halide element combination, would have the effect of impairing the image sharpness by crossover exposure. The terms "actinic" and "non-actinic" radiation according to the present invention are used to indicate, respectively, radiation of wavelength shorter than 500 nm (Ultraviolet and blue radiation), preferably from 300 to less than 500 nm, and radiation of wavelength from 500 nm upwards (green, red and Infrared radiation), preferably from 500 to 1200 nm. The term "insensitive" as used herein, describes either primary or intrinsic insensitivity of the silver halide grain emulsion (or layer including it) to a certain range of wavelengths, as defined, or secondary or induced insensitivity (or unreachability) of the silver halide emulsion (or layer including it) in the double silver halide element because of filter action exercised by a further emulsion layer or layers interposed between the considered "insensitive" layer and the radiation emitting screen or by filter dyes or agents included in the considered layer or in such interposed layers. Accordingly, the latent image formed by radiation (preferably comprised between 300 and 1200 nm) exposure in each silver halide emulsion layer is primarily formed by exposure to the radiation emitted by the adjacent fluorescent phosphor layer, with no significant contribution by opposite screen. Preferably, the radiation exposure necessary to produce a Dmax of 1.0 on said front silver halide layer will produce a Dmax of less than 0.2 on the back silver halide emulsion layer under the same development conditions. Conversely, an exposure at the $D_{max}$ of the back layer that produces a Dmax of 1.0 will produce a Dmax of less than 0.2 on the front layer.

The terms "front" and "back" in the present invention are used to distinguish the different elements of the cassette and the unsymmetrical screen pair and double side coated silver halide element combination not their position relating to exposing X radiation source. Accordingly, X radiation may enter the unsymmetrical screen pair and double-side coated silver halide element within the cassette through either the front element or the back element of the cassette.

The term "silver halide element" in the present invention includes both silver halide "photographic" elements which use liquid development to produce the final image and silver halide "photothermographic" elements, often referred to as "dry silver" elements, which do not use liquid development to produce the final image, as described thereinafter. In both photographic and photothermographic silver halide elements, exposure of the silver halide to radiation produces small clusters of silver ions. The imagewise distribution of these clusters is known in the art as the latent image. This latent image generally is not visible by ordinary means and the light-sensitive element must be further processed in order to produce a visual image. This visual image is produced by the catalytic reduction of silver which is in catalytic proximity to the specks of the latent image. The photographic silver halide element is preferably used in medical radiography and the photothermographic silver halide element is preferably used in industrial radiography.

Consequently, the present invention refers to a radiographic cassette, to be used with a combination consisting of light-sensitive elements to be used in radiography, comprising two radiographic fluorescent front and back screens respectively fixed to the front and back element of the cassette and a silver halide radiographic element comprising a support base and front and back silver halide emulsion layers each coated on one face of said support base, wherein said front screen is fixed to the front element of the cassette and placed adjacent to said front silver halide layer and said back layer is fixed to the back element of the cassette and placed adjacent to said back silver halide layer, and wherein 1) said front screen comprises a phosphor emitting a first radiation and said front silver halide layer comprises silver halide grains sensitive to said first radiation emitted by said front screen, and 2) said back screen comprises a phosphor emitting a second radiation and said back silver halide layer comprises silver halide grains sensitive to said second radiation emitted by said back screen, characterized by the fact that a) said first radiation emitted by said front screen has a wavelength differing from said second radiation emitted by said back screen of at least 50 nm, b) said front silver halide emulsion layer is substantially insensitive to said second radiation emitted by said back screen, and c) said back silver halide emulsion layer is substantially insensitive to said first radiation emitted by said front screen, the difference in the wavelength region of said first and said second radiation and the insensitivity of each silver halide layer with respect to the radiation emitted by the opposite screen being such as to reduce crossover exposure of at least 10%, if compared to that given by a symmetrical combination consisting of a pair of green radiation emitting fluorescent screens and a double-side coated green sensitized silver halide emulsion radiographic element.

According to a preferred embodiment of this invention, in the combination of a pair of front and back radiographic fluorescent screens and a double-side coated silver halide radiographic element, said front screen fixed to the front element of the cassette comprises a non-actinic radiation, preferably green light, emitting phosphor and is arranged adjacent to a front silver halide layer comprising a silver halide emulsion spectrally sensitized to the radiation emitted by said front screen, and said back screen fixed to the back element of the cassette comprises an actinic radiation, preferably UV light, emitting phosphor and is arranged adjacent to a back silver halide layer comprising a silver halide emulsion insensitized to the visually observable regions of the electromagnetic spectrum (that is 410 to 750 nm).

Preferably, the phosphors used in the front fluorescent screens fixed to the front element of the cassette applied in the present invention emit radiation in the green or red region of the visible spectrum. More preferably, said phosphors emit radiation in the green region of the visible spectrum. Most preferably, said phosphors emit radiation having more than about 80% of its spectral emission above 480 nm and its maximum of emission in the wavelength range of 530-570 nm. Green emitting phosphors which may be used in the front fluorescent screens of the present invention include rare earth activated rare earth oxysulfide phosphors of at least one rare earth element selected from yttrium, lanthanum, gadolinium and lutetium, rare earth activated rare earth oxyhalide phosphors of the same rare earth elements, a phosphor composed of a borate of the above rare earth elements, a phosphor composed of a phosphate of the above rare earth elements and a phosphor composed of tantalate of the above rare earth elements. These rare earth green emitting phosphors have been extensively described in the patent literature, for example in U.S. Pat. Nos. 4,225,653, 3,418,246, 3,418,247, 3,725,704, 3,617,743, 3,974,389, 3,591,516, 3,607,770, 3,666,676, 3,795,814, 4,405,691, 4,311,487 and 4,387,141. These rare earth phosphors have a high X-ray stopping power and high efficiency of light emission when excited with X radiation and enable radiologists to use substantially lower X radiation dosage levels. Particularly suitable phosphors for use in the front fluorescent screens of the present invention are terbium or terbium-thulium activated rare earth oxysulfide phosphors represented by the general formula

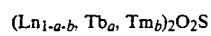
$$(Ln_{1-a-b}, Tb_a, Tm_b)_2O_2S \qquad (I)$$

wherein Ln is at least one rare earth from lanthanum, gadolinium and lutetium, and a and b are numbers such as to meet the conditions $0.0005 \leq a \leq 0.09$ and $0 \leq b \leq 0.01$, respectively, and terbium or terbium-thulium activated rare earth oxysulfide phosphors represented by the general formula (II)

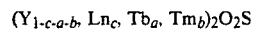
$$(Y_{1-c-a-b}, Ln_c, Tb_a, Tm_b)_2O_2S \qquad (II)$$

wherein Ln is at least one rare earth element selected from lanthanum, gadolinium and lutetium, and a, b and c are numbers such as to meet the conditions $0.0005 \leq a \leq 0.09$, $0 \leq b \leq 0.01$ and $0.65 \leq c \leq 0.95$, respectively.

Figure 3:
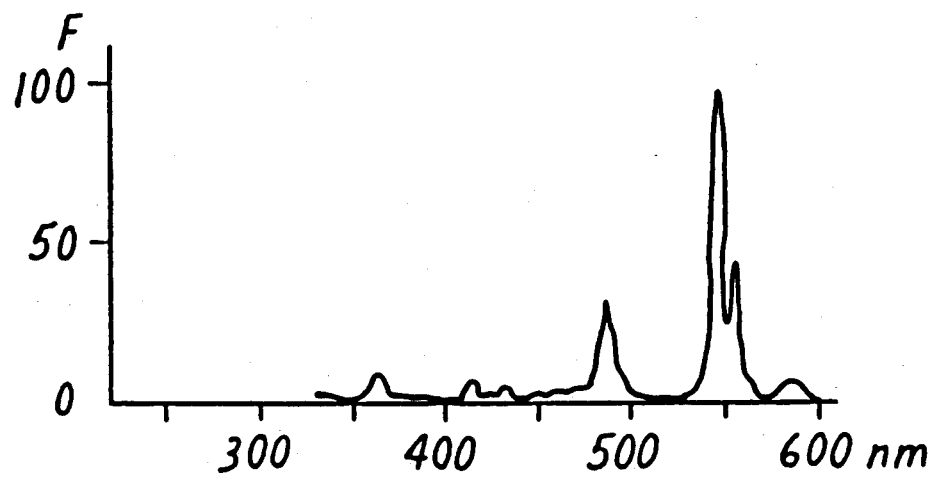
FIGS. 3 and 5 are graphs showing the emission spectra of the fluorescent radiographic screens used in the present invention.

FIG. 3 shows an emission spectrum of a front fluorescent screen comprising a fluorescent layer of $(Gd_{1-0.05}, Tb_{0.05})_2O_2S$ phosphor as green emitting phosphor, expressed as fluorescence (F) versus wavelengths (nm).

The front silver halide emulsion layer, to be arranged according to this invention adjacent to the front fluorescent screen, comprises silver halide grains which are optically sensitized to the spectral region of the radiation emitted by the screens, preferably to a spectral region of an interval comprised within 25 nm from the wavelength of the maximum emission of the screen, more preferably within 15 nm, and most preferably within 10 nm. The silver halide grains of the front silver halide layer have adsorbed on their surface spectral sensitizing dyes that exhibit absorption maxima in the regions of the visible spectrum where the front fluorescent screen emits. Preferably, spectral sensitizing dyes according to this invention are those which exhibit J aggregates if adsorbed on the surface of the silver halide grains and a sharp absorption band (J-band) with a bathochromic shifting with respect to the absorption maximum of the free dye in aqueous solution. Spectral sensitizing dyes producing J aggregates are well known in the art, as illustrated by F. M. Hamer, Cyanine Dyes and Related Compounds, John Wiley and Sons, 1964, Chapter XVII and by T. H. James, The Theory of the Photographic Process, 4th edition, Macmillan, 1977, Chapter 8.

In a preferred form, J-band exhibiting dyes are cyanine dyes. Such dyes comprise two basic heterocyclic nuclei joined by a linkage of methine groups. The heterocyclic nuclei preferably include fused benzene rings to enhance J aggregation.

The heterocyclic nuclei are preferably quinolinium, benzoxazolium, benzothiazolium, benzoselenazolium, benzimidazolium, naphthoxazolium, naphthothiazolium and naphthoselenazolium quaternary salts.

J-band type dyes preferably used in the present invention have the following general formula (III):

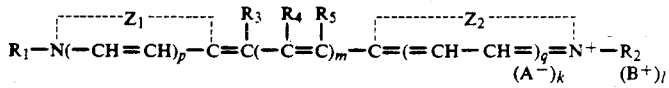

wherein $Z_1$ and $Z_2$ may be the same or different and each represents the elements necessary to complete a cyclic nucleus derived from basic heterocyclic nitrogen compounds such as oxazoline, oxazole, benzoxazole, the naphthoxazoles (e.g., naphth{2,1-d}oxazole, naphth{2,3-d}oxazole, and naphth{1,2-d}oxazole), thiazoline, thiazole, benzothiazole, the naphthothiazoles (e.g., naphtho{2,1-d}thiazole), the thiazoloquinolines (e.g., thiazolo{4,5-b}quinoline), selenazoline, selenazole, benzoselenazole, the naphthoselenazoles (e.g., naphtho{1,2-d}selenazole, 3H-indole (e.g 3 3-dimethyl3H-indole), the benzindoles (e.g. 1,1-dimethylbenzindole), imidazoline, imidazole, benzimidazole, the naphthimidazoles (e.g., naptha{2,3-d}-imidazole), pyridine, and quinoline, which nuclei may be substituted on the ring by one or more of a wide variety of substituents such as hydroxy, the halogens (e.g., fluoro, bromo, chloro, and iodo), alkyl groups or substituted alkyl groups (e.g., methyl, ethyl, propyl, isopropyl, butyl, octyl, dodecyl, 2-hydroxyethyl, 3-sulfopropyl, carboxymethyl, 2- cyanoethyl, and trifluoromethyl), aryl groups or substituted aryl groups (e.g., phenyl, 1-naphthyl, 2-naphthyl, 4-sulfophenyl, 3-carboxyphenyl, and 4-biphenyl), aralkyl groups (e.g., benzyl and phenethyl), alkoxy groups (e.g., methoxy, ethoxy, and isopropoxy), aryloxy groups (e.g., phenoxy and 1-naphthoxy), alkylthio groups (e.g., ethylthio and methylthio), arylthio groups (e.g., phenylthio, p-tolythio, and 2-naphthylthio), methylenedioxy, cyano, 2-thienyl, styryl, amino or substituted amino groups (e.g., anilino, dimethylanilino, diethylanilino, and morpholino), acyl groups (e.g., acetyl and benzoyl), and sulfo groups, $R_1$ and $R_2$ can be the same or different and represent alkyl groups, aryl groups, alkenyl groups, or aralkyl groups, with or without substituents, (e.g., carboxymethyl, 2-hydroxyethyl, 3-sulfopropyl, 3-sulfobutyl, 4-sulfobutyl, 2-methoxyethyl, 2-sulfatoethyl, 3-thiosulfatoethyl, 2-phosphonoethyl, chlorophenyl, and bromophenyl), $R_3$ represents a hydrogen atom, $R_4$ and $R_5$ can be the same or different and represent a hydrogen atom or a lower alkyl group of from 1 to 4 carbon atoms, p and q are 0 or 1, except that both p and q preferably are not 1, m is 0 or 1 except that when m is 1 both p and q are 0 and at least one of $Z_1$ and $Z_2$ represents imidazoline, oxazoline, thiazoline, or selenazoline, A is an anionic group, B is a cationic group, and k and l may be 0 or 1, depending on whether ionic substituents are present. Variants are, of course, possible in which $R_1$ and $R_3$, $R_2$ and $R_5$, or $R_1$ and $R_2$ together represent the atoms necessary to complete an alkylene bridge.

In the most preferred form of this invention, wherein the phosphors of the front fluorescent screen are rare earth phosphors emitting in the green region of the visible spectrum, said optical sensitizing dyes adsorbed on said silver halide grains of the front silver halide layer are represented by the following general formula (IV):

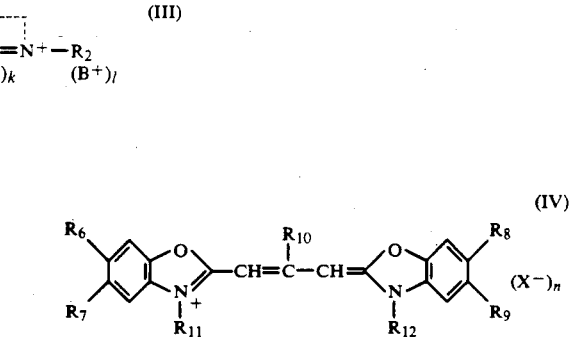

wherein $R_{10}$ represents a hydrogen atom or a lower alkyl group of from 1 to 4 carbon atoms (e.g. methyl, and ethyl), $R_6$, $R_7$, $R_8$ and $R_9$ each represents a hydrogen atom, a halogen atom (e.g. chloro, bromo, iodo, and fluoro), a hydroxy group, an alkoxy group (e.g. methoxy and ethoxy), an amino group (e.g. amino, methylamino, and dimethylamino), an acylamino group (e.g. acetamido and propionamido), an acyloxy group (e.g. acetoxy group), an alkoxycarbonyl group (e.g. methoxycarbonyl, ethoxycarbonyl, and butoxycarbonyl), an alkyl group (e.g. methyl, ethyl, and isopropyl), an alkoxycarbonylamino group (e.g. ethoxycarbonylamino) or an aryl group (e.g. phenyl and tolyl), or, together, $R_6$ and $R_7$ and, respectively, $R_8$ and $R_9$ can be the atoms necessary to complete a benzene ring (so that the heterocyclic nucleus results to be, for example, an α-naphthoxazole nucleus, a β-naphthoxazole or a β,β'-naphthoxazole), $R_{11}$ and $R_{12}$ each represents an alkyl group (e.g. methyl, propyl, and butyl), a hydroxyalkyl group (e.g. 2hydroxyethyl, 3-hyiroxypropyl, and 4-hydroxybutyl), an acetoxyalkyl group (e.g. 2-acetoxyethyl and 4-acetoxybutyl), an alkoxyalkyl group (e.g. 2-methoxyethyl and 3-methoxypropyl), a carboxyl group containing alkyl group (e.g. carboxymethyl, 2-carboxyethyl, 4-carboxybutyl, and 2-(2-carboxyethoxy)-ethyl), a sulfo group containing alkyl group (e.g. 2-sulfoethyl, 3-sulfopropyl, 4- sulfobutyl, 2-hydroxy3- sulfopropyl, 2-(3-sulfopropoxy)- propyl, p-sulfobenzyl, and p-sulfophenethyl), a benzyl group, a phenetyl group, a vinylmethyl group, and the like, $X^-$ represents an acid anion (e.g. a chloride, bromide, iodide, thiocyanate, methylsulfate, ethylsulfate, perchlorate, and p-toluensulfonate ion), and n represents 1 or 2.

The alkyl groups included in said substituents $R_6$, $R_7$, $R_8$, $R_9$, $R_{10}$, and $R_{11}$ and, more particularly, the alkyl portions of said alkoxy, alkoxycarbonyl, alkoxycarbonylamino, hydroxyalkyl, acetoxyalkyl groups and of the alkyl groups associated with a carboxy or sulfo group each preferably contain from 1 to 12, more preferably from 1 to 4 carbon atoms, the total number of carbon atoms included in said groups preferably being no more than 20.

The aryl groups included in said substituents $R_6$, $R_7$, $R_8$ and $R_9$ each preferably contain from 6 to 18, more preferably from 6 to 10 carbon atoms, the total number of carbon atoms included in said groups arriving up to 20 carbon atoms.

The following are specific examples of J-band sensitizing dyes belonging to those represented by the general formula (IV) above:

| Dye | $R_{10}$ | $R_6$ | $R_7$ | $R_8$ | $R_9$ | $R_{11}$ | $R_{12}$ | X | n |
|---|---|---|---|---|---|---|---|---|---|
| A* | $C_2H_5$ | H | 5-Cl | H | 5'-Cl | $(CH_2)_3SO_3^-$ | $(CH_2)_3SO_3H$ | — | 1 |
| B** | $C_2H_5$ | H | 5-Cl | H | 5'-$C_6H_5$ | $(CH_2)_3SO_3^-$ | $\begin{array}{c}CH_3\\|\\(CH_2)_2CHSO_3H\end{array}$ | — | 1 |
| C | $CH_3$ | H | 5-$OCH_3$ | H | 5'-$OCH_3$ | $C_2H_5$ | $(CH_2)_3SO_3^-$ | — | 1 |
| D | $C_2H_5$ | 6-$CH_3$ | 5-Cl | H | 5'-Cl | $(CH_2)_4SO_3$ | $(CH_2)_3SO_3H$ | — | 1 |
| E | $C_2H_5$ | H | 5-Cl | H | 5'-Cl | $C_2H_5$ | $C_2H_5$ | I | 2 |

*Triethylamine salt
**Sodium salt

Figure 4:
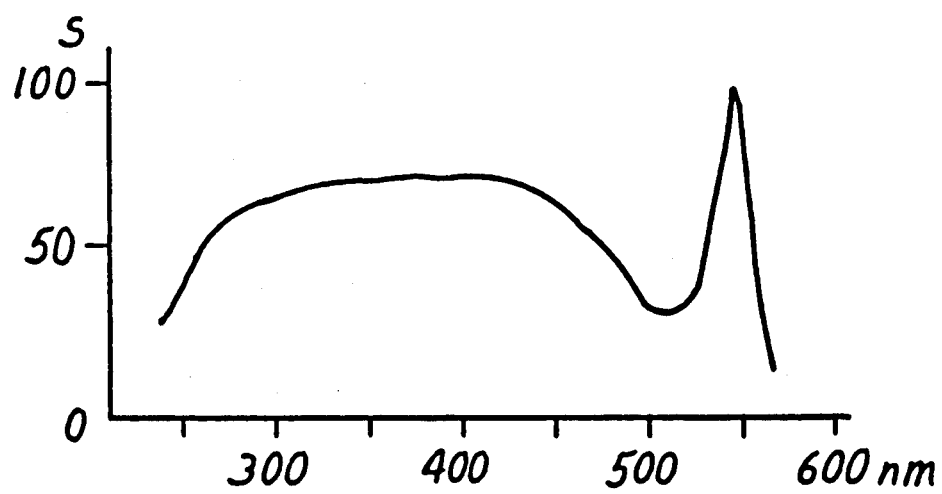
FIGS. 4 and 6 are graphs illustrating the spectral sensitivity of a double-side coated silver halide radiographic element used in the present invention.

FIG. 4 shows the sensitivity spectrum of a front silver halide layer comprising silver bromoiodide grains comprising 2.3 mole percent iodide and having adsorbed on their surface the optical sensitizing dye A above, expressed as sensitivity (S) versus wavelengths (nm).

Preferably, the phosphors used in the back fluorescent screens applied in the present invention emit radiation in the ultraviolet region of the electromagnetic spectrum. More preferably, said phosphors emit radiation having more than about 80% of their spectral emission below 410 nm and their maximum of emission in the wavelength range of 300-360 nm. Ultraviolet emitting phosphors which may be used in the back fluorescent screens of the present invention include ultraviolet emitting phosphors known in the art such as lead or lanthanum activated barium sulfate phosphors, barium fluorohalide phosphors, lead activated barium silicate phosphors, gadolinium activated yttrium oxide phosphors, barium fluoride phosphors, alkali metal activated rare earth niobate or tantalate phosphors etc. Ultraviolet emitting phosphors are described for example in BE 703,998 and 757,815, in EP 202,875 and by Buchanan et al., J. Applied Physics, vol. 9, 4342-4347, 1968, and by Clapp and Ginther, J. of the Optical Soc. of America, vol. 37, 355-362, 1947. Particularly suitable ultraviolet emitting phosphors for use in the back fluorescent screens of the present invention are those represented by the general formula (V)

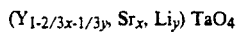

wherein x and y are numbers such as to meet the conditions $10^{-5} \leq x \leq 1$ and $10^{-4} \leq y \leq 0.1$ as described in EP 202,875.

Figure 5:
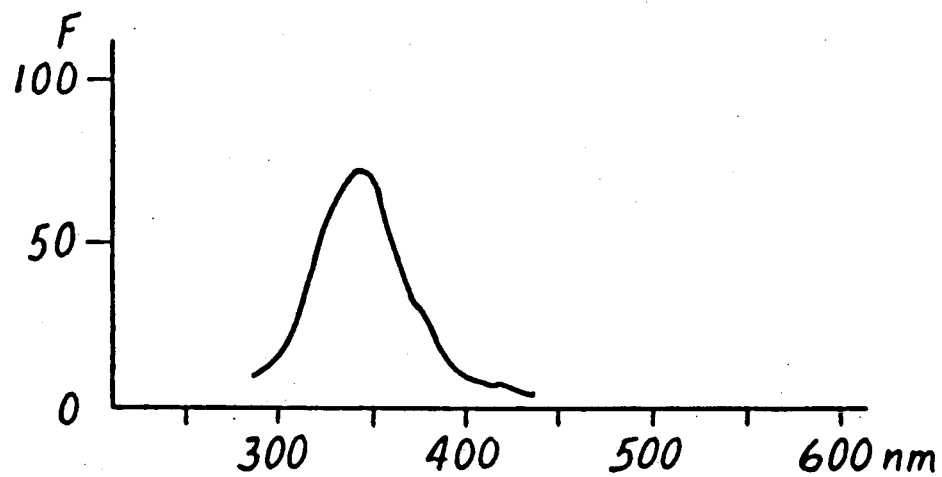

FIG. 5 shows an emission spectrum of a back fluorescent screen comprising a fluorescent layer of (Y, Sr, Li)$TaO_4$ phosphor as ultraviolet emitting phosphor, expressed as fluorescence (F) versus wavelengths (nm).

Figure 6:
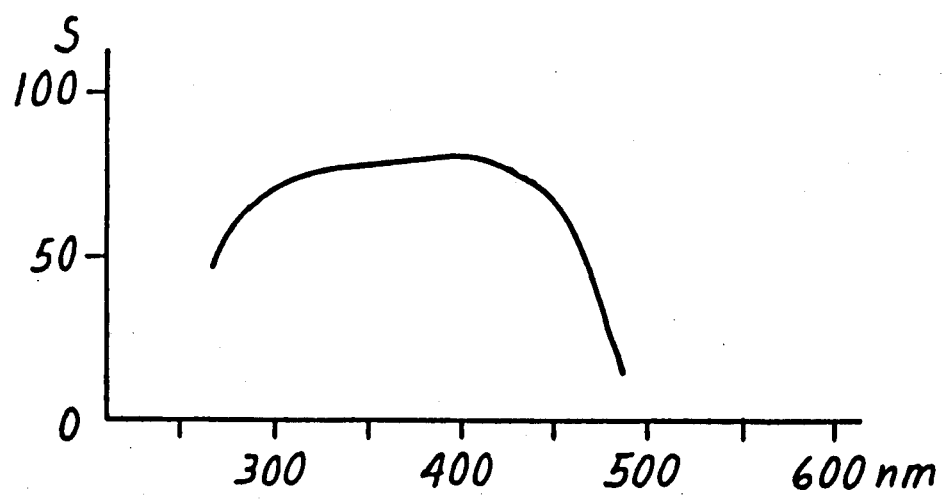

The back silver halide emulsion layer, arranged according to this invention adjacent to the back actinic light emitting phosphor screen, comprises silver halide grains which are not optically sensitized but possess the inherent spectral sensitivity of the known types of photosensitive silver halides. Said inherent spectral sensitivity of the conventional silver halide emulsions used in photographic films as known ranges in the ultraviolet and blue region of the electromagnetic spectrum FIG. 6 shows the sensitivity spectrum of a back silver halide emulsion layer comprising silver bromoiodide grains comprising 2.3 percent mole iodide and having no optical sensitizing dye adsorbed on their surface, expressed as sensitivity (S) versus wavelengths (nm).

According to the present invention, the non-actinic radiation (preferably green light) emitted by the front screen imagewise exposes the adjacent front silver halide layer comprising silver halide grains optically sensitized to the radiation emitted by said screens. Part of said non-actinic radiation reaches the opposite back silver halide layer but does not crossover expose the silver halide grains of the back silver halide layer as those grains are not optically sensitized to the radiation emitted by said front screen. The ultraviolet or blue emission of the back fluorescent screen undergoes absorption by the adjacent back silver halide layer and imagewise exposes the silver halide grains which are not optically sensitized, rather than crossover passing to the opposite front silver halide layer. This is due to the fact that silver halide grains possess a good inherent absorption of light with a wavelength below 500 nm and a strong light scattering of ultraviolet and blue light through the dispersed silver halide particles of the emulsion layer. The above implies not having a large amount of ultraviolet or blue light of the back fluorescent screen to expose the opposite front silver halide layer. The crossover exposure reduction attained with the screen pair and double silver halide element combination of this invention is preferably at least 10 percent, more preferably at least 20 percent in comparison with a conventional combination of green emitting fluorescent screens and double coated green sensitized silver halide radiographic element. Accordingly, the image sharpness is improved by reducing crossover exposure using a unique combination of conventional silver halide emulsion layers and fluorescent screens.

The light-sensitive double-side coated silver halide radiographic element comprises a transparent polymeric base of the type commonly used in radiography, for instance a polyester base, and in particular a polyethylene terephthalate base.

In the silver halide photographic elements of this invention, the silver halide emulsions coated on the two surfaces of the support, the front optically sensitized silver halide emulsion and the back optically unsensitized silver halide emulsion, may be similar or different and comprise emulsions commonly used in photographic elements, such as silver chloride, silver iodide, silver chloro-bromide, silver chloro-bromo-iodide, silver bromide and silver bromo-iodide, the silver bromo-iodide being particularly useful for radiographic elements. The silver halide grains may have different shapes, for instance cubic, octahedrical, tabular shapes, and may have epitaxial growths; they generally have mean sizes ranging from 0.1 to 3 μm, more preferably from 0.4 to 1.5 μm. The emulsion are coated on the support at a total silver coverage comprised in the range from about 3 to 6 grams per square meter. The silver halide binding material used is a water-permeable hydrophilic colloid, which preferably is gelatin, but other hydrophilic colloids, such as gelatin derivatives, albumin, polyvinyl alcohols, alginates, hydrolized cellulose esters, hydrophilic polyvinyl polymers, dextrans, polyacrylamides, hydrophilic acrylamide copolymers and alkylacrylates can also be used alone or in combination with gelatin.

As regards the processes for silver halide emulsion preparation and use of particular ingredients in the emulsion and in the light-sensitive element, reference is made to Research Disclosure 18,431 published in August 1979, wherein the following chapters are dealt with in deeper details:

IA. Preparation, purification and concentration methods for silver halide emulsions.
IB. Emulsion types.
IC. Crystal chemical sensitization and doping.
II. Stabilizers, antifogging and antifolding agents.
IIA. Stabilizers and/or antifogging.
IIB. Stabilization of emulsions chemically sensitized with gold compounds.
IIC. Stabilization of emulsions containing polyalkylene oxides or plasticizers.
IID. Fog caused by metal contaminants.
IIE. Stabilization of materials comprising agents to increase the covering power.
IIF. Antifoggants for dichroic fog.
IIG. Antifoggants for hardeners and developers comprising hardeners.
IIH. Additions to minimize desensitization due to folding.
III. Antifoggants for emulsions coated on polyester bases. stabilize emulsions at safety lights.
IIJ. Methods to stabilize emulsions at safety lights.
IIK. Methods to stabilize X-ray materials used for high temperature, Rapid Access, roller processor transport processing.
III. Compounds and antistatic layers.
IV. Protective layers.
V. Direct positive materials.
VI. Materials for processing at room light.
IX. Spectral sensitization.
X. UV sensitive materials.
XII. Bases.

The silver halide photothermographic elements of this invention basically comprise a light insensitive, reducible silver source, a light sensitive material which generates silver when irradiated, and a reducing agent for the silver source. The light sensitive material is generally photographic silver halide which must be in catalytic proximity to the light insensitive silver source. Catalytic proximity is an intimate physical association of these two materials so that when silver specks or nuclei are generated by the irradiation or light exposure of the photographic silver halide, those nuclei are able to catalyze the reduction of the silver source by the reducing agent. It has been long understood that silver is a catalyst for the reduction of silver ions and the silver-generating light sensitive silver halide catalyst progenitor may be placed into catalytic proximity with the silver source in a number of different fashions, such as partial metathesis of the silver source with a halogen-containing source (e.g. US Pat. No. 3,457,075), coprecipitation of the silver halide and silver source material (e.g. US Pat. No. 3,839,049), and any other method which intimately associates the silver halide and the silver source.

The silver source used in this area of technology is a material which contains a reducible source of silver ions. The earliest and still preferred source comprises silver salts of long chain fatty carboxylic acids, usually of from 10 to 30 carbon atoms. The silver salt of behenic acid or mixtures of acids of like molecular weight have been primarily used. Salts of other organic acids or other organic materials such as silver imidazolates have been proposed, and British Pat. No. 1,110,046 discloses the use of complexes of inorganic or organic silver salts as image source materials. Silver salts of long chain (10 to 30, preferably 15 to 28 carbon atoms) fatty carboxylic acids are preferred in the practice of the present invention.

Photothermographic emulsions are usually constructed as one or two layers per side of the support. Single layer construction must contain the silver source material, the silver halide, the developer and binder as well as optional additional materials such as toners, coating aids and other adjuvants. Two-layer constructions must contain the silver source and the silver halide in an emulsion layer (usually the layer adjacent the support) and the other ingredients in the second layer or both layers. The silver source material should constitute from about 20 to 70 percent by weight of the imaging layer. Preferably it is present as 30 to 55 percent by weight. The second layer in a two-layer construction would not affect the percentage of the silver source material desired in the single imaging layer.

The silver halide may be any photosensitive silver halide as silver bromide, silver iodide, silver chloride, silver bromoiodide, silver chlorobromoiodide, silver chlorobromide, etc., and may be added to the emulsion layer in any fashion which places it in catalytic proximity to the silver source. The silver halide is generally present as 0.75 to 15 percent by weight of the imaging layer, although larger amounts are useful. It is preferred to use from 1 to 10 percent by weight silver halide in the imaging layer and most preferred to use from 1.5 to 7.0 percent. The vast list of photographic adjuvants and processing aids may be used in silver halide emulsion preparation. These materials include chemical sensitizers (including sulfur and gold compounds), development accelerators (e.g. onium and polyonium compounds), alkylene oxide polymer accelerators, antifoggant compounds, stabilizers (e.g. azaindenes, especially the tetra- and pentaazaindenes), surface active agents (particularly fluorinated surfactants), antistatic agents (particularly fluorinated compounds), plasticizers, matting agents, and the like.

The reducing agent for the silver ion may be any material, preferably organic material, which will reduce silver ion to metallic silver. Conventional photographic developers such as phenidone, hydroquinones, and cathecol are useful, but hindered phenol reducing agents are preferred. The reducing agents should be present as 1 to 20 percent by weight of the imaging layer. In a two-layer construction, if the reducing agent is in the second layer, slightly higher proportions, of from about 2 to 20 percent tend to be more desirable.

Toners such as phthalazinone, phthalazine and phthalic acid are not essential to the construction, but highly desirable. These materials may be present, for example, in amounts of from 0.2 to 5 percent by weight.

The binder may be selected from any of the well known natural and synthetic resins such as gelatin, polyvinyl acetals, polyvinyl chloride, polyvinyl acetate, cellulose acetate, polyolefins, polyesters, polystyrene, polyacrylonitrile, polycarbonates, and the like. Copolymers and terpolymers are, of course, included in these definitions. The polyvinyl acetals, such as polyvinyl butyral and polyvinyl formal, and vinyl copolymers, such as polyvinyl acetate/chloride are particularly desirable. The binders are generally used in a range of 20 to 75 percent by weight of each layer, and preferably about 30 to 55 percent by weight.

As previously noted, various other adjuvants may be added to the photothermographic emulsions of the present invention. For example, toners, accelerators, acutance dyes, sensitizers, stabilizers, surfactants, lubricants, coating aids, antifoggants, leuco dyes, chelating agents, and various other well known additives may be usefully incorporated. The use of acutance dyes matched to the spectral emission of the intensifying screen is particularly desirable.

The balance in properties of the photothermographic emulsion must be precisely restricted by the proportions of materials in the emulsion. The proportions of the silver salt and organic acid are particularly critical in obtaining necessary sensitometric properties in the photothermographic element for radiographic use. In conventional photothermographic emulsions, it is common to use approximately pure salts of organic acids (e.g., behenic acid, stearic acid and mixtures of long chain acids) as the substantive component of the emulsion. Sometimes minor amounts or larger amounts of the acid component are included in the emulsion. In the practice of the present invention the molar ratio of organic silver salt to organic acid must be in the range of 1.5/1 to 6.2/1 (salt/acid). Below that range, the contrast has been found to be too low, and above that range the speed and background stability of the emulsion drop off unacceptably. It is preferred that the ratio be in the range of 2.0/1 to 3.50/1.

The silver halide may be provided by in situ halidization or by use of pre-formed silver halide.

The process of industrial radiography would be performed by using a conventional X-ray projection source or other high energy particle radiation sources including gamma and neutron sources. As well known in the art, the particular phosphors used have a high absorption coefficient for the radiation emitted from the source. Usually this radiation is high energy particle radiation which is defined as any of X-rays, neutrons and gamma radiation. The industrial material would be placed between the controllable source of X-rays and the industrial radiographic system of the present invention. A controlled exposure of X-rays would be directed from the source and through the industrial material so as to enter and impact the radiographic system at an angle approximately perpendicular to the plane of the cassette comprising the intensifying screens and the photothermographic film contiguous to the inside surface of the screens. The radiation absorbed by the phosphors of the screens would cause light to be emitted by the screens which in turn would generate a latent image in the silver halide grains of the two emulsion layers. Conventional thermal development would then be used on the exposed film.

The X radiation image converting screens of this invention have a fluorescent layer comprising a binder and a phosphor dispersed therein. The fluorescent layer is formed by dispersing the phosphor in the binder to prepare a coating dispersion, and then applying the coating dispersion by a conventional coating method to form a uniform layer. Although the fluorescent layer itself can be a radiation image converting screen when the fluorescent layer is self-supporting, the fluorescent layer is generally provided on a substrate to form a radiation image converting screen. Further, a protective layer for physically and chemically protecting the fluorescent layer is usually provided on the surface of the fluorescent layer. Furthermore, a primer layer is sometimes provided between the fluorescent layer and the substrate to closely bond the fluorescent layer to the substrate, and a reflective layer is sometimes provided between the substrate (or the primer) and the fluorescent layer.

The binder employed in the fluorescent layer of the X radiation image converting screens of the present invention, can be, for example, one of the binders commonly used in forming layers: gum arabic, protein such as gelatin, polysaccharides such as dextran, organic polymer binders such as polyvinylbutyral, polyvinylacetate, nitrocellulose, ethylcellulose, vinylidene-chloride-vinylchloride copolymer, polymethylmethacrylate, polybutylmethacrylate, vinylchloride-vinylacetate copolymer, polyurethane, cellulose acetate butyrate, polyvinyl alcohol, and the like.

Generally, the binder is used in an amount of 0.01 to 1 part by weight per one part by weight of the phosphor. However, from the viewpoint of the sensitivity and the sharpness of the screen obtained, the amount of the binder should preferably be small. Accordingly, in consideration of both the sensitivity and the sharpness of the screen and the easiness of application of the coating dispersion, the binder is preferably used in an amount of 0.03 to 0.2 parts by weight per one part by weight of the phosphor. The thickness of the fluorescent layer is generally within the range of 10 $\mu$m to 1 mm.

In the radiation image converting screens of the present invention, the fluorescent layer is generally coated on a substrate. As the substrate, various materials such as polymer material, glass, wool, cotton, paper, metal, or the like can be used. From the viewpoint of handling the screen, the substrate should preferably be processed into a sheet or a roll having flexibility. In this connection, as the substrate is preferably either a plastic film (such as a cellulose triacetate film, polyester film, polyethylene terephthalate film, polyamide film, polycarbonate film, or the like), or ordinary paper or processed paper (such as a photographic paper, baryta paper, resin-coated paper, pigment-containing paper which contains a pigment such as titanium dioxide, or the like). The substrate may have a primer layer on one surface thereof (the surface on which the fluorescent layer is provided) for the purpose of holding the fluorescent layer tightly. As the material of the primer layer, an ordinary adhesive can be used. In providing a fluorescent layer on the substrate (or on the primer layer or on the reflective layer), a coating dispersion comprising the phosphor dispersed in a binder may be directly applied to the substrate (or to the primer layer or to the reflective layer).

Further, in the X radiation image converting screens of the present invention, a protective layer for physically and chemically protecting the fluorescent layer is generally provided on the surface of the fluorescent layer intended for exposure (on the side opposite the substrate). When, as mentioned above, the fluorescent layer is self-supporting, the protective layer may be provided on both surfaces of the fluorescent layer. The protective layer may be provided on the fluorescent layer by directly applying thereto a coating dispersion to form the protective layer thereon, or may be provided thereon by bonding thereto the protective layer formed beforehand. As the material of the protective layer, a conventional material for a protective layer such a nitrocellulose, ethylcellulose, cellulose acetate, polyester, polyethylene terephthalate, and the like can be used.

The X radiation image converting screens of the present invention may be colored with a colorant. Further, the fluorescent layer of the radiation image converting screen of the present invention may contain a white powder dispersed therein. By using a colorant or a white powder, a radiation image converting screen which provides an image of high sharpness can be obtained.

EXAMPLES

The invention can be better illustrated by reference to the following specific examples and comparative investigations.

Green Emitting Phosphor Screen $GRS_1$

A high resolution green emitting phosphor screen, screen $GRS_1$, was prepared consisting of a $(Gd_{1-0.05}, Tb_{0.05})_2O_2S$ phosphor with average particle grain size of 3 $\mu$m coated in a hydrophobic polymer binder at a phosphor coverage of 270 g/m$^2$ and a thickness of 70 $\mu$m on a polyester support. Between the phosphor layer and the support a reflective layer of $TiO_2$ particles in a poly(urethane) binder was coated. The screen was overcoated with a cellulose triacetate layer.

Green Emitting Phosphor Screen $GRS_2$

A medium resolution green emitting phosphor screen, screen $GRS_2$, was prepared consisting of a $(Gd_{1-0.05}, Tb_{0.05})_2O_2S$ phosphor with average particle grain size of 4 7 $\mu$m coated in a hydrophobic polymer binder at a phosphor coverage of 480 g/m$^2$ and a thickness of 120 $\mu$m on a polyester support. Between the phosphor layer and the support a reflective layer of $TiO_2$ particles in a poly(urethane) binder was coated. The screen was overcoated with a cellulose triacetate layer.

UV Emitting Phosphor Screen $UVS_3$

An UV emitting phosphor screen, screen $UVS_3$, was prepared consisting of the type NP-3040 (Y, Sr, Li)-$TaO_4$ phosphor of Nichia Kagaku Kogyo K.K. with average particle grain size of 5.1 um coated in a hydrophobic polymer binder at a phosphor coverage of 450 g/m$^2$ and a thickness of 110 $\mu$m on a polyester support. Between the phosphor layer and the support a reflective layer of $TiO_2$ particles in a poly(urethane) binder was coated. The screen was overcoated with a cellulose triacetate layer.

Light-sensitive Photographic Film $GRUVF_1$

A light-sensitive film having a green sensitized silver halide emulsion layer (hereinafter designated front layer) coated on one side of the support and a spectrally unsensitized silver halide emulsion layer (hereinafter designated back layer) coated on the other side of the support, film $GRUVF_1$, was prepared in the following manner. On one side of a polyester support was coated a green sensitized silver halide gelatin emulsion layer containing cubic silver bromoiodide grains (having 2.3 mole percent iodide and an average grain size of 0.65 $\mu$m) at 2.57 g/m$^2$ Ag and 1.9 g/m$^2$ gelatin. The emulsion was sulfur and gold chemically sensitized and spectrally sensitized with 1,070 mg/ mole Ag of the green sensitizing Dye A, anhydro-5,5'-dichloro-9-ethyl-3,3'-bis(3-sulfopropyl)-oxacarbocyanine hydroxyde triethylamine salt. A protective overcoat containing 0.9 g/m$^2$ gelatin was applied to said silver bromoiodide front layer. On the other side of the polyester support was coated a spectrally unsensitized silver halide silver halide gelatin emulsion layer containing cubic silver bromoiodide grains (comprising a 1:1 by weight blend of silver bromoiodide grains having 2 mole percent iodide and an average grain size of 1.3 $\mu$m and silver bromoiodide grains having 2.3 mole percent iodide and an average grain size of 0.65 $\mu$m) at 2.51 g/m$^2$ Ag and 1.8 g/m$^2$ gelatin. The emulsion was sulfur and gold chemically sensitized. A protective overcoat containing 0.9 g/m$^2$ gelatin was applied to said silver bromoiodide back layer.

Light-sensitive Photographic Film $GRUVF_2$

A light-sensitive film having a green sensitized silver halide emulsion layer (hereinafter designated front layer) coated on one side of the support and a spectrally unsensitized silver halide emulsion layer (hereinafter designated back layer) coated on the other side of the support, film $GRUVF_2$, was prepared in the following manner. On one side of a polyester support was coated the green sensitized silver halide gelatin emulsion layer containing cubic silver bromoiodide grains of the front layer of film $GRUVF_1$ (having 2.3 mole percent iodide and an average grain size of 0.65 um) at 2.60 g/m$^2$ Ag and 1.9 g/m$^2$ gelatin. The emulsion was sulfur and gold chemically sensitized and spectrally sensitized with 1,070 mg/Ag mole of the green sensitizing Dye A, anhydro-5,5'-dichloro-9-ethyl-3,3'-bis(3-sulfopropyl)-oxacarbocyanine hydroxyde triethylamine salt. A protective overcoat containing 0.9 g/m$^2$ gelatin was applied to said silver bromoiodide front layer. On the other side of the polyester support was coated a spectrally unsensitized silver halide silver halide gelatin emulsion layer containing cubic silver bromoiodide grains of the front layer of film $GRUVF_1$ (having 2.3 mole percent iodide and an average grain size of 0.65 $\mu$m) at 2.49 g/m$^2$ Ag and 1.9 g/m$^2$ gelatin. The emulsion was sulfur and gold chemically sensitized. A protective overcoat containing 0.9 g/m$^2$ gelatin was applied to said silver bromoiodide back layer.

Light-sensitive Photographic Film $UVUVF_3$

A light-sensitive film having a spectrally unsensitized silver halide emulsion layer coated on each side of a support, film $UVUVF_3$, was prepared in the following manner. On each side of a polyester support was coated a spectrally unsensitized silver halide silver halide gelatin emulsion layer containing cubic silver bromoiodide grains of the front layer of film $GRUVF_1$ (having 2.3 mole percent iodide and an average grain size of 0.65 $\mu$m) at 2.60 and 2.49 g/m$^2$ Ag, respectively, and 1.9 g/m$^2$ gelatin. The emulsion was sulfur and gold chemically sensitized. A protective overcoat containing 0.9 g/m$^2$ gelatin was applied to each silver bromoiodide layer.

Light-sensitive Photographic Film $GRGRF_4$

A light-sensitive film having a green sensitized silver halide emulsion layer coated on each side of a support, film $GRGRF_4$, was prepared in the following manner. On each side of a polyester support was coated the green sensitized silver halide gelatin emulsion layer containing cubic silver bromoiodide grains of the front layer of film $GRUVF_1$ (having 2.3 mole percent iodide and an average grain size of 0.65 $\mu$m) at 2.18 g/m$^2$ Ag and 1.9 g/m² gelatin. The emulsion was sulfur and gold chemically sensitized and spectrally sensitized with 1,070 mg/ mole Ag of the green sensitizing Dye A, anhydro-5,5'-dichloro-9-ethyl-3,3'-bis(3-sulfo-propyl)-oxacarbocyanine hydroxyde triethylamine salt. A protective overcoat containing 0.9 g/m² gelatin was applied to each silver bromo-iodide layer.

Comparison of Screen Pairs and Light-sensitive Photographic Films

Pairs of screens in combination with double coated light-sensitive photographic films described above were exposed as follows. Referring to FIGS. 1 and 2, film-screens combinations were made in which the front screen was fixed to the front element of the cassette and placed in contact with the front emulsion layer and the back screen was fixed to the back element of the cassette and placed in contact with the back emulsion layer. Each screen pair-film combination was exposed to X-rays from a tungsten target tube operated at 80 kVp and 25 mA from a distance of 120 cm. The X-rays passed through an aluminium step wedge before reaching the screen-film combination. Following exposure the films were processed in a 3M Trimatic TM XP507 processor using 3M XAD/2 developer replenisher and 3M XAF/2 fixer replenisher.

The speed and the image quality are reported in the following table. Percent crossover was calculated by using the following equation:

$$\text{Percent Crossover} = \frac{1}{\text{antilog}(\delta \log E)} \times 100$$

wherein $\delta \log E$ is the difference in speed between the two emulsion layers of the same film when exposed with a single screen (the lower the percent crossover, the better the image quality).

TABLE

| Comb. | Screen Pair Front/Back | Film | Rel. Speed log E | Crossover percentage | |
|---|---|---|---|---|---|
| 1 | GRS$_1$/GRS$_1$ | GRGRF$_4$ | 0.00 | 37 | |
| 2 | UVS$_3$/UVS$_3$ | UVUVF$_3$ | −0.39 | 9 | |
| 3 | GRS$_1$/UVS$_3$ | GRUVF$_2$ | −0.22 | 4* | 9** |
| 4 | GRS$_1$/UVS$_3$ | GRUVF$_1$ | 0.00 | 9* | 5** |
| 5 | GRS$_2$/UVS$_3$ | GRUVF$_1$ | +0.18 | 4* | 5** |

Figure 7:
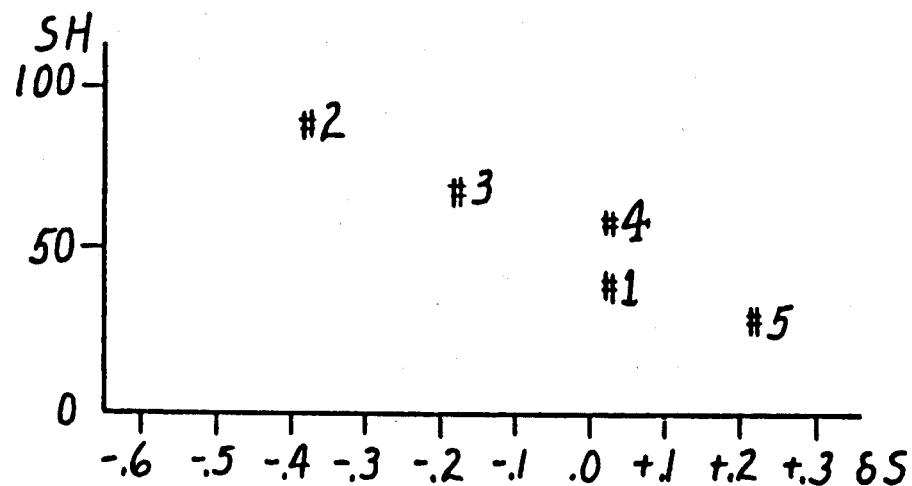
FIGS. 7 and 8 are graphs showing sharpness and granularity versus sensitivity of combinations formed by a double-side coated silver halide radiographic element and a pair of screens.
Figure 8:
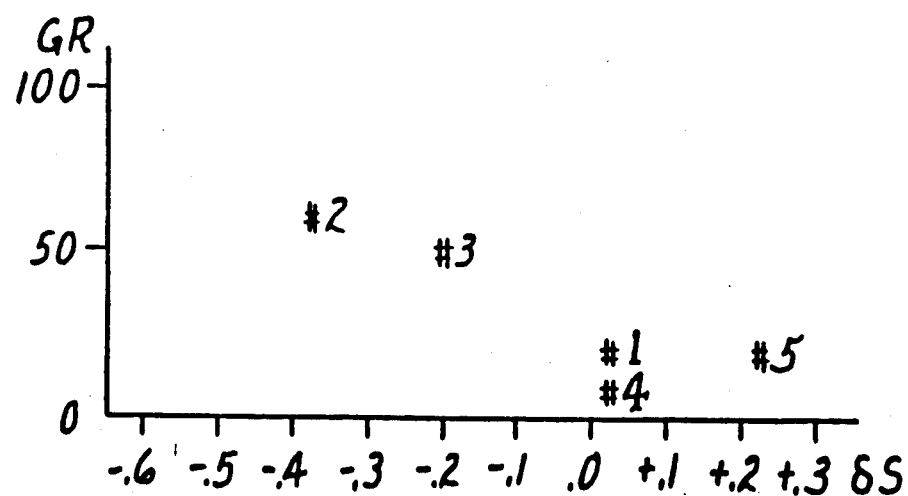

*crossover measured in the front emulsion layer
**crossover measured in the back emulsion layer Sharpness and granularity of the screen pair-film combinations were determined as follows. Each screen pair-film combination was exposed to X-rays from a tungsten tube operated at 80 kVp and 25 mA from a distance of 150 cm. The X-rays passed through a 100 μ thick lead Funk target sold by Huttner Company before reaching the screen-film combination. Following exposure the films were processed in the 3M Trimatic TM XP507 processor using 3M XAD/2 developer replenisher and 3M XAF/2 fixer replenisher. Sharpness and granularity of the processed films were determined by visual examination of ten observers skilled in making image comparisons. FIGS. 7 and 8 are graphs illustrating the sharpness (SH) and granularity (GR) versus the difference of sensitivity $\delta S$ of the double coated silver halide element and fluorescent screen pair combinations and that of green sensitive double coated element combined with green emitting fluorescent screen pair taken as reference. In the graphs, the higher the numbers of sharpness and granularity, the better is the sharpness and granularity. Sharpness and granularity of the UV and blue light sensitive double coated silver halide element combined with UV emitting fluorescent screen pair are the best but at the lower level of sensitivity, while sharpness and granularity of the double coated element and screen pair combinations of this invention are better or comparable to that of green sensitive double coated element combined with green emitting fluorescent screen pair at comparable or higher level of sensitivity.

Light-sensitive Photothermographic Film GRBLF$_5$ a) Preparation of the silver soap.

To 20 l of water at 80° C. were added 634.5 g of Humbo acid 9022 (a long chain fatty carboxylic acid comprising 90% C$_{20}$+C$_{22}$, 5% C$_{18}$ and 5% other acid), 131 g Humbo acid 9718 (a long chain fatty carboxylic acid comprising 95% C$_{18}$ and 5% C$_{16}$) and 0.44 moles of a 0.08 μm cubic silver bromoiodide (6% mole iodide) emulsion. While stirring, were added 89.18 g NaOH dissolved in 1.25 l water, then 19 ml of conc. HNO$_3$ diluted with 50 ml water. At 55° C. were added 364.8 g AgNO$_3$ dissolved in 2.5 l water at 55° C. The mixture was heated at 55° C. for one hour while stirring slowly, centrifugated while spray washing until 20,000 ohms resistance of water was obtained and dried.

b) Preparation of the silver salt homogenate. Silver soap powder above (12% by weight), toluene (20% by weight) and methylethyl ketone (68% by weight) were mixed, soaked over-night, added with 12 g polyvinylbutyral (Butwar$^{TM}$ B-76) and homogenized at 4,000, then 8,000 PSI.

c) Preparation of the first trip.

200 g of the silver soap homogenate above were added with 40 g methylethyl ketone and 30 g polyvinylbutyral Butwar TM TM B-76) and mixed for one-half hour. The mixture was added with 2.2 ml of a 10% HgBr$_2$ in methanol, stirred for 5 minutes, then added with 4 g of W50 Developer of formula

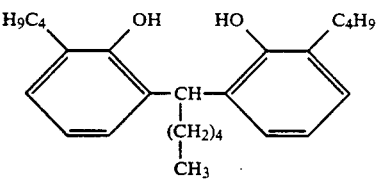

One 50 g part of the dispersion above was added with 0.6 ml of a solution of 0.04 g per 10 ml of the following blue sensitizer

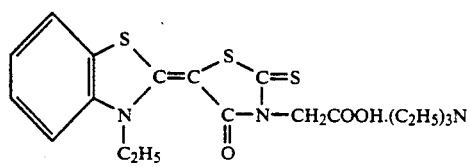

A second 50 g part of the dispersion above was added with 0.6 ml of a solution of 0.05 g per 10 ml of the following green sensitizer

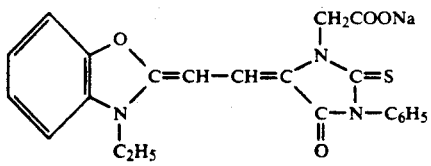

d) Coating of the first trip.

The blue sensitized dispersion above was coated on a clear 4 mil ($2 \times 10^{-4}$ m) polyethyleneterephthalate support at 5 mils over the support and dried for 3 minutes at 87° C. On the opposite side of the support the green sensitized dispersion above was coated at 5 mils over the support and dried for 3 minutes at 87° C.

e) Preparation of the second trip.

| Component | Parts by Weight |
|---|---|
| A. Methylethyl ketone | 78.58 |
| B. Acetone | 12.02 |
| C. Methanol | 4.91 |
| D. FC-431 (3M Fluorocarbon) | 0.04 |
| E. Phthalazine | 0.59 |
| F. 4-Methyl-phthalic acid | 0.41 |
| G. Tetrachlorophthalic anhydride | 0.27 |
| H. Tetrachlorophthalic acid | 0.12 |
| I. Cellulose acetate ester | 3.06 |

A through H were added to a container and mixed until solids were dissolved. I was then added and mixed for one hour until was dissolved.

f) Coating of the second trip. On the blue sensitizing coating previously applied, the second trip was coated over the first at 2.25 mils and dried for 3 minutes at 87° C. The film was turned over and, on the green sensitized coating previously applied, the second trip was coated at 2.25 mils and dried for 3 minutes at 87° C.

g) Evaluation of the film. A sample of the finished double-side coated photothermographic film was exposed with a xenon flash sensitometer through a 460 nanometer narrow band filter at a setting of $10^{-3}$ seconds through a 0-4 continuous density wedge. The exposed sample was processed for four seconds at 131° C. in a roller driven thermal processor. The sensitometry was recorded as $D_{min}=0.21$ and $D_{max}=4.22$. Another sample was exposed and processed as above but using a 560 nanometer narrow band filter. The sensitometry was recorded as $D_{min}=0.21$ and $D_{max}=2.19$. Clearly there is no cross-over from the green sensitized layer to the blue sensitizing layer. The blue sensitized layer when coated singly on one side of a polyester substrate recorded an image as follows : $D_{min}=0.13$ and $D_{max}=2.56$.

I claim:

1. A cassette comprising a front element hinged on the rear edge thereof to a back element of the cassette and a first fluorescent intensifying screen fixed, in the interior of said cassette, to said front element and a second fluorescent intensifying screen fixed, in the interior of said cassette, to said back element, said cassette containing a radiographic film comprising a transparent polymeric film having silver halide photosensitive layers on both sides, and said film is between and in close contact with said screens, said first intensifying screen comprising a first radiation emitting phosphor and said second intensifying screen comprising a second radiation emitting phosphor, characterized by the fact that said first radiation emitted by said first intensifying screen is in a first green region of the electromagnetic spectrum and said second radiation emitted by said second intensifying screen is in the ultraviolet region of the electromagnetic spectrum.

2. The radiographic cassette provided with intensifying screens of claim 1, wherein said first radiation emitted by said first intensifying screen differs from said second radiation emitted by said second intensifying screen of at least 50 nm.

3. The radiographic cassette provided with intensifying screens of claim 1, wherein
    a) said first intensifying screen comprises a phosphor emitting non-actinic radiation, and
    b) said back screen comprises a phosphor emitting UV radiation.

4. The radiographic cassette provided with intensifying screens of claim 1, wherein said front screen comprises a green radiation emitting phosphor having more than 80% of its spectral emission above 480 nm and the emission maximum in the wavelength region between 530 and 570 nm.

5. The radiographic cassette provided with intensifying screens of claim 1, wherein said front screen comprises a green radiation emitting phosphor represented by the general formula:

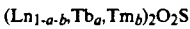

wherein Ln is at least a rare earth selected among lanthanum, gadolinium and lutetium, and a and b are numbers respectively satisfying the conditions $0.0005 \leq a \leq 0.09$ and $0 \leq b \leq 0.01$, or by the general formula:

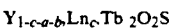

wherein Ln is at least a rare earth selected among lantanum, gadolinium and lutetium, and a, b and c are numbers respectively satisfying the conditions $0.0005 \leq a \leq 0.09$, $0 \leq b \leq 0.01$ and $0.65 \leq c \leq 0.95$.

6. The radiographic cassette provided with intensifying screens of claim 1, wherein said front screen comprises a terbium activated gadolinium or lanthanum oxysulfide phosphor substantially having emission peaks at 487 and 545 nm.

7. The radiographic cassette provided with intensifying screens of claim 1, wherein said back screen comprises a UV radiation emitting phosphor having more than 80% of its spectral emission below 410 nm and the emission maximum in the wavelength range from 300 to 360 nm.

8. The radiographic cassette provided with intensifying screens of claim 1, wherein said back screen comprises a UV radiation emitting phosphor selected in the class consisting of lead or lanthanum activated barium sulfate phosphors, barium fluorohalide phosphors, lead activated barium silicate phosphors, gadolinium activated yttrium oxide phosphors, barium fluoride phosphors and alkali metal activated rare earth niobate or tantalate phosphors.

9. The radiographic cassette provided with intensifying screens of claim 1, wherein said back screen comprises a UV light emitting phosphor corresponding to the general formula:

wherein x and y are numbers such as to satisfy the conditions $10^{-5} \leq x \leq 1$ and $10^{-4} \leq y \leq 0.1$.

* * * * *

UNITED STATES PATENT AND TRADEMARK OFFICE
CERTIFICATE OF CORRECTION

PATENT NO. : 5,070,248
DATED : Dec. 3, 1991
INVENTOR(S) : Sergio Pesce It is certified that error appears in the above-identified patent and that said Letters Patent is hereby corrected as shown below:

Col. 22, line 34  Change formula to read:
-- $(Y_{1-c-a-b}, Ln_c, Tb_a, Tm_b)_2 O_2 S$ --

Col. 10, line 42  "3-hyiroxypropyl" should be
--3-hydroxypropyl--.

Signed and Sealed this

Fifth Day of October, 1993

BRUCE LEHMAN

*Attest:*

*Attesting Officer*  Commissioner of Patents and Trademarks